(12) United States Patent
Murelitharan

(10) Patent No.: US 7,516,659 B2
(45) Date of Patent: Apr. 14, 2009

(54) INERTIAL FORCE SENSOR

(75) Inventor: Muniandy Murelitharan, Relau (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 11/433,022

(22) Filed: May 11, 2006

(65) Prior Publication Data

US 2007/0261489 A1     Nov. 15, 2007

(51) Int. Cl.
*G01P 15/00* (2006.01)
(52) U.S. Cl. ............. 73/514.01; 73/514.19; 73/514.26; 73/653; 356/615; 250/230; 250/229
(58) Field of Classification Search ............. 73/514.01, 73/514.19, 514.26, 653; 356/615; 250/230, 250/229
See application file for complete search history.

(56) References Cited

U.S. PATENT DOCUMENTS

| | | | | |
|---|---|---|---|---|
| 3,550,437 A | * | 12/1970 | Skinner | 73/653 |
| 3,597,090 A | * | 8/1971 | Humphrey | 356/149 |
| 4,521,108 A | * | 6/1985 | Horikawa | 356/123 |
| 5,063,781 A | * | 11/1991 | Conforti et al. | 73/651 |
| 5,936,294 A | * | 8/1999 | Zhang | 257/435 |
| 6,775,013 B2 | * | 8/2004 | Wang | 356/614 |
| 7,293,459 B2 | * | 11/2007 | Machida | 73/514.26 |
| 2004/0190006 A1 | * | 9/2004 | Ogasawara et al. | 356/615 |
| 2005/0115319 A1 | * | 6/2005 | Bickford et al. | 73/514.01 |
| 2007/0261504 A1 | * | 11/2007 | Murelitharan | 73/865.9 |

* cited by examiner

*Primary Examiner*—Hezron Williams
*Assistant Examiner*—Gunnar J Gissel

(57) ABSTRACT

A sensor having a mass that moves relative to a structure is disclosed. A spring mechanism applies a restoring force to the mass when the mass moves from an equilibrium position with respect to the structure. A first code scale is attached to the mass and viewed by a first imaging system that is fixed with respect to the structure. The first imaging system forms images of the first code scale that are used by a controller to provide an indication of the relative position of the mass with respect to the structure. The mass can be located in a sealed chamber in the structure that has a transparent liquid through which the mass moves. The first imaging can view the first code scale from outside the chamber through a transparent window in the chamber.

10 Claims, 5 Drawing Sheets

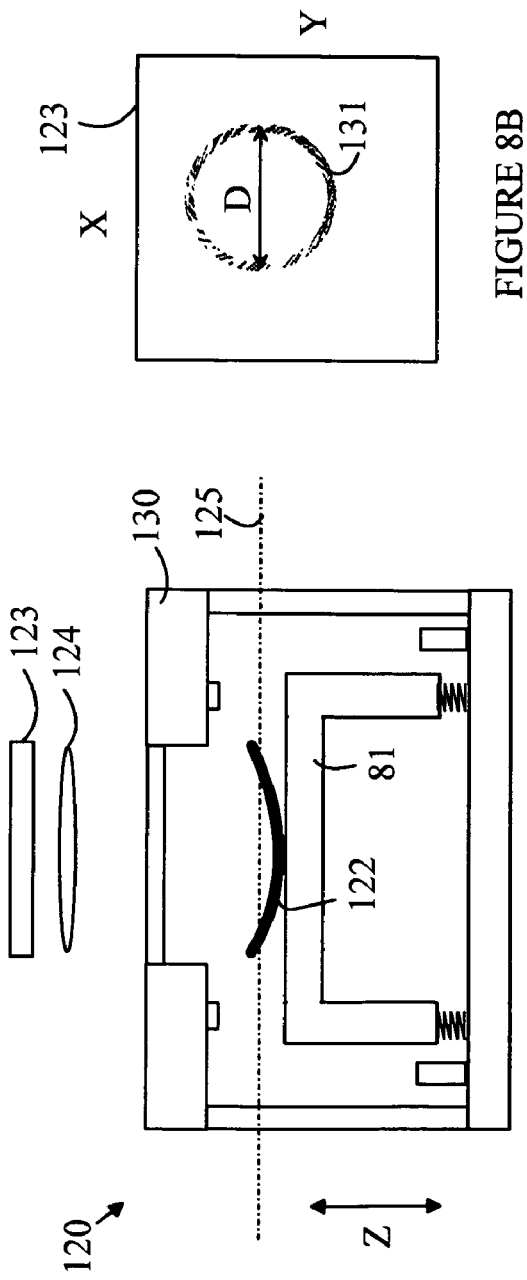
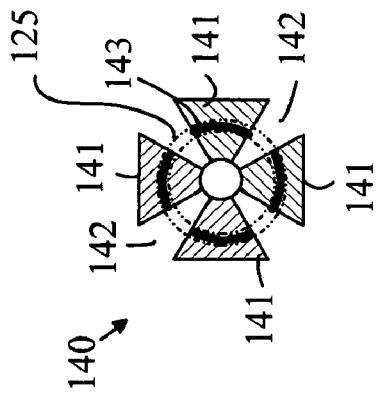
FIGURE 8A
FIGURE 8B
FIGURE 8C

INERTIAL FORCE SENSOR

BACKGROUND OF THE INVENTION

Inertial force sensors are used in numerous consumer products. For example, various occupant protection systems in automobiles utilize such sensors to trigger actions designed to protect the vehicle occupant when the automobile is involved in a collision or the system senses that a collision is imminent. Such systems are used to actuate air bags in the event of a collision and to pretension seatbelts when sensors indicate that a collision is about to occur.

These sensors typically utilize a weight and spring arrangement in which a moveable weight is fixed to a stationary component by a spring. When the apparatus is accelerated or decelerated, the weight moves relative to the stationary component. Such sensors typically include a transducer that converts the position of the weight relative to the fixed component, or the rate of change in that position, into an electrical signal representing the displacement or rate of change of the position, respectively.

The transducers rely on a variety of techniques to convert the motion of the mass into an electrical signal. In the simplest schemes, the mass is mounted on a cantilever that provides the spring function. A contact on the cantilever makes an electrical connection with a contact on the stationary component when the mass moves a predetermined distance. Systems in which the cantilever includes a piezoelectric element that generates a current in response to the bending of the element are also known.

The accuracy with which the force on the mass can be measured depends on the reproducibility of the spring constant and mass from device to device. In addition, the accuracy depends on the sensitivity of the transducer. Low cost sensors are often fabricated using micro-machining techniques. If a simple threshold measurement is all that is required, the reproducibility limitations can be easily met with such techniques. Such sensors are sufficient for use in triggering airbag deployment in an automobile. However, if a more accurate analog measurement is needed, the device may need to be individually calibrated leading to increased cost.

In addition, the amount of motion that must be sensed in these miniature devices requires a transducer that has high sensitivity, particularly if an analog measurement of the displacement is needed. The cost of such transducers can limit the applications in which such analog sensors can be utilized.

In addition, these sensors must often operate in a hostile environment in which the temperature varies over a large range and in which dirt and other contamination can buildup leading to device failure. Hence, the devices must typically be sealed in a manner that keeps out the contamination while still allowing the sensor to function properly.

Furthermore, these sensors typically require one transducer per degree of freedom. Hence, if motion in multiple dimensions is to be tracked, multiple transducers are required. The additional transducers increase the cost of the sensor.

Finally, these sensors are subject to oscillations resulting from resonances in the spring-mass system. Hence, some means for damping such oscillation is often required. The damping mechanism must not interfere with the transducer mechanism, and hence, there are constraints on the damping mechanism that further increase the cost of the sensor.

SUMMARY OF THE INVENTION

The present invention includes a sensor having a mass that moves relative to a structure. A spring mechanism applies a restoring force to the mass when the mass moves from an equilibrium position with respect to the structure. A first code scale is attached to the mass and viewed by a first imaging system that is fixed with respect to the structure. The first imaging system forms images of the first code scale that are used by a controller to provide an indication of the relative position of the mass with respect to the structure. In one aspect of the invention, the mass can be located in a sealed chamber in the structure. The chamber has a transparent liquid through which the mass moves and provides a damping mechanism to reduce oscillations in the position of the mass. The first imaging system can view the first code scale from outside the chamber through a transparent window in the chamber. In another aspect of the invention, the chamber includes a planar surface over which the mass moves.

In another aspect of the invention, the sensor also includes a second imaging system that is fixed with respect to the structure and a second code scale that is attached to the mass and that is viewed by the second imaging system. The mass moves in three-dimensions, and the position indication provides a location for the mass relative to first, second, and third coordinates. The position of the mass relative to a first one of the coordinates is determined from the image formed by the first imaging system, and the position of the mass relative to a second one of the coordinates is determined from the image formed by the second imaging system.

In another aspect of the invention, the first imaging system is characterized by a focal plane and a depth of focus, and the first code scale includes a three-dimensional structure having a pattern thereon. The three-dimensional structure has a thickness that is at least 10 times the depth of focus. The first imaging system uses the portion of the image that is in focus in providing the indication of position.

BRIEF DESCRIPTION OF THE DRAWINGS

FIG. 8A is a cross-sectional view of another embodiment of a sensor according to the present invention.

FIG. 8B is an exemplary image formed by a photodiode array with one particular example of a position scale.

FIG. 8C is another embodiment of a position scale and an image formed by the photodiode array with that position scale.

DETAILED DESCRIPTION OF THE PREFERRED EMBODIMENTS OF THE INVENTION

Figure 2:
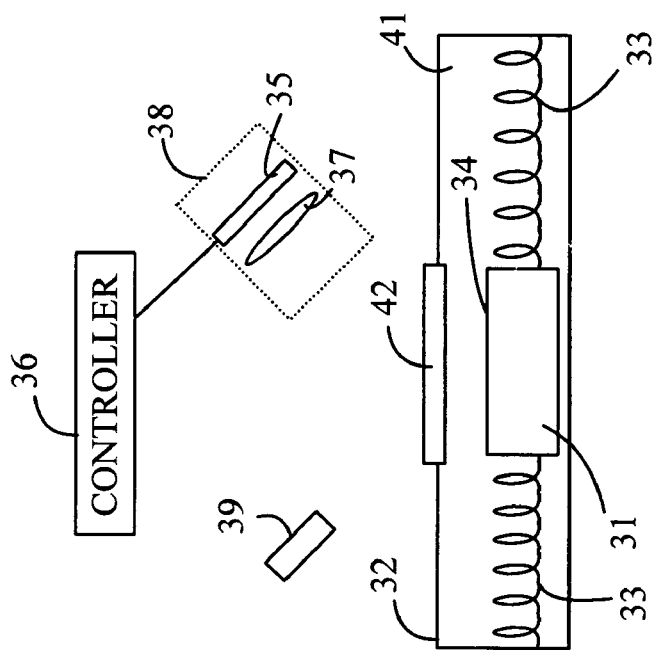
FIG. 2 is a cross-sectional view through line 2-2 shown in FIG. 1.
Figure 1:
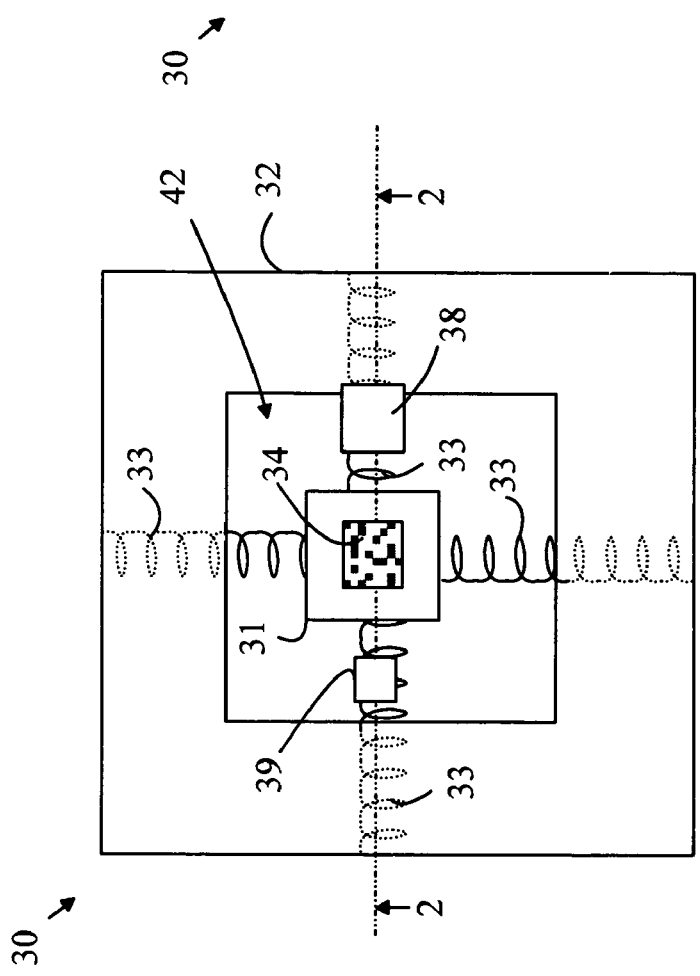
FIG. 1 is a top view of a sensor according to one embodiment of the present invention.

The manner in which the present invention provides its advantages can be more easily understood with reference to FIGS. 1-2, which illustrate a two-dimensional inertial force sensor according to one embodiment of the present invention. FIG. 1 is a top view of sensor 30, and FIG. 2 is a cross-sectional view through line 2-2 shown in FIG. 1. Sensor 30 includes a mass 31 that is connected to a structure 32 by a plurality of springs 33. Mass 31 moves with respect to structure 32 when a force is applied to either mass 31 or structure 32. In the absence of such a force, mass 31 is maintained at a predetermined position relative to structure 32 by springs 33. Mass 31 includes a scale 34 that moves with mass 31 and includes a pattern that is viewed by an imaging system 38 that is fixed with respect to structure 32. Imaging system 38 includes an image sensor 35 that forms an image of a portion of scale 34. By comparing the portion of scale 34 that is currently within a predetermined field of view of imaging sensor 35, controller 36 can determine the position of mass 31 with respect to structure 32.

Scale 34 can include an absolute encoding pattern that specifies the displacement of scale 34 relative to an equilibrium position. Controller 36 causes image sensor 35 to generate images at regular time intervals. In this case, controller 36 compares the image received from image sensor 35 with this known pattern after displacing the known pattern by various amounts. For example, the correlation of the image from sensor 35, after that image has been displaced by each test displacement, with the known pattern can be computed. The displacement that provides the highest correlation is chosen.

Alternatively, scale 34 can include a random pattern. In this case, successive frames from image sensor 35 are compared after one frame is displaced relative to the other to determine the displacement that occurred between the frames. This mode of operation provides a relative motion indication in a manner similar to that used in determining the motion of an optical mouse over a surface.

The above-described embodiments rely on the imaging of an encoding pattern from scale 34 onto image sensor 35. Hence, the distance between image sensor 35 and scale 34 must remain substantially constant when mass 31 moves to allow an in focus image to be generated on image sensor 35. It should be noted that only the portion of scale 34 that is actually being imaged at any particular time needs to be in focus. This constraint can be accommodated in a number of ways. For example, if the aperture of lens 37 is sufficiently small, the depth of the field of the camera will be sufficient to allow the desired portion of the scale to be in focus over the expected range of motion of mass 31 in a direction perpendicular to the plane of scale 34. An optional light source 39 can be utilized to increase the illumination of scale 34 thereby allowing a smaller aperture lens to be utilized, which, in turn, provides a greater depth of field.

If the mass is constrained to move in one plane, then the optical axis of the camera can be placed such that the optical axis of the lens is perpendicular to that plane. Hence, if scale 34 has a planar surface that remains parallel to the plane of motion when mass 31 moves, the scale will remain at a fixed distance from image sensor 35, and hence, the portion of the scale image in question will remain in focus.

The embodiments discussed above have resonant frequencies that can be excited if the mass is caused to move too quickly. Such resonances will interfere with the operation of the sensor, and hence, are to be avoided. The optical sensing system utilized in the present invention makes it possible to provide a damping mechanism as well as protection from the outside environment. In one embodiment of the present invention, structure 32 includes a sealed chamber 41. Mass 34 and springs 33 are contained within this chamber. Scale 34 is viewed through a transparent window 42. Chamber 41 is filled with a viscous liquid that damps oscillations in the movement of mass 31. In addition, the liquid can provide a lubricating function to reduce friction between mass 31 and the walls of chamber 41. The liquid is transparent at the wavelength of light source 39, and hence, does not interfere with position determinations.

Figure 4:
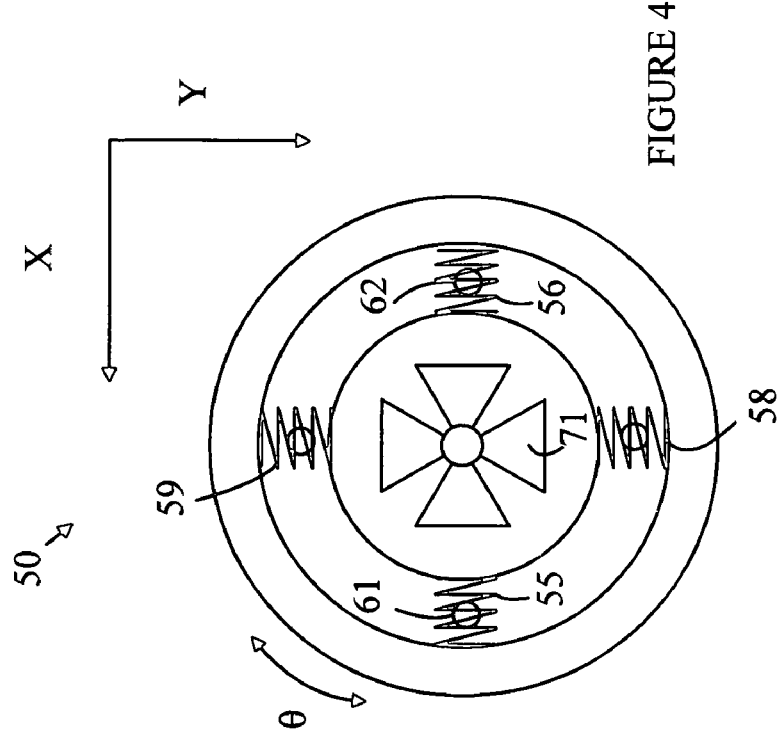
FIG. 4 is a top view of sensor 50 as seen through line 4-4 shown in FIG. 3.
Figure 3:
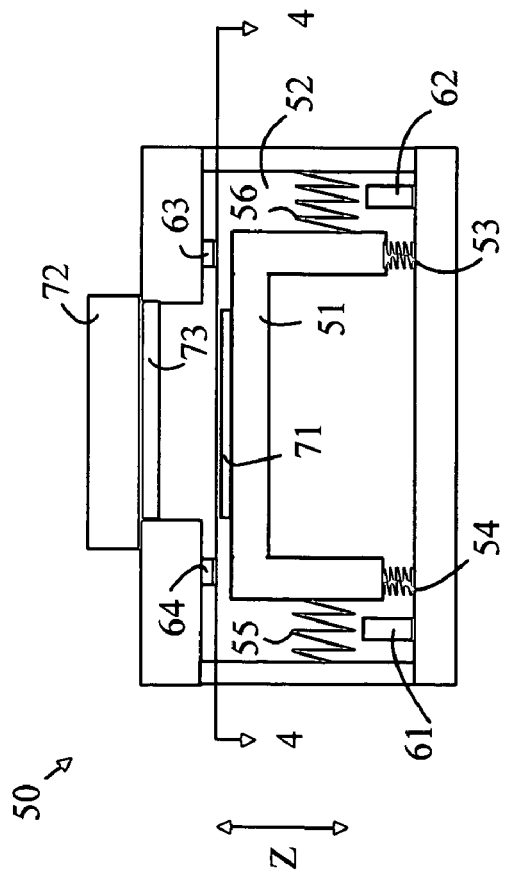
FIG. 3 is a cross-sectional view of another embodiment of a sensor according to the present invention.

The above-described embodiments of the present invention can be used to measure vibration in two dimensions. However, embodiments that measure the vibration of the mass in three linear dimensions as well as in a rotational direction can also be constructed. Refer now to FIGS. 3 and 4, which illustrate an embodiment of the present invention that provides a measurement of the rotation of the mass as well as the vibration amplitude in two-dimensions. FIG. 3 is a cross-sectional view of sensor 50, and FIG. 4 is a top view of sensor 50 as seen through line 4-4 shown in FIG. 3. Sensor 50 includes a cylindrical mass 51 that is supported by springs within a chamber 52. Exemplary support springs are shown at 53-56 and 58-59. The support springs return mass 51 to an equilibrium position when mass 51 is no longer subjected to an inertial force. The maximum vibration amplitude in each direction is set by a number of stops. Exemplary stops are shown at 61-64.

A scale 71 is incorporated in the top surface of mass 51 and is viewed by a camera system 72 that includes a light source and camera similar to those discussed above. Scale 71 is viewed through window 73. To simplify the drawing, the individual components of camera system 72 have been omitted. The depth of field of the camera in camera system 72 is sufficient to allow images of scale 71 to be made even when mass 71 is displaced in the Z-direction. By comparing the position of scale 71 in a sequence of pictures, a controller incorporated in camera system 72 can determine the amplitude of the force applied to mass 71 both in the X and Y directions as well as any rotational forces in the θ direction.

In principle, sensor 50 can also be used to measure vibration or inertial forces in the Z-direction. However, scale 73 is poorly suited for measuring displacements in the Z-direction since it is planar. Hence, a movement of the mass in the Z-direction only results in a small change in the magnification of the code scale.

Figure 6:
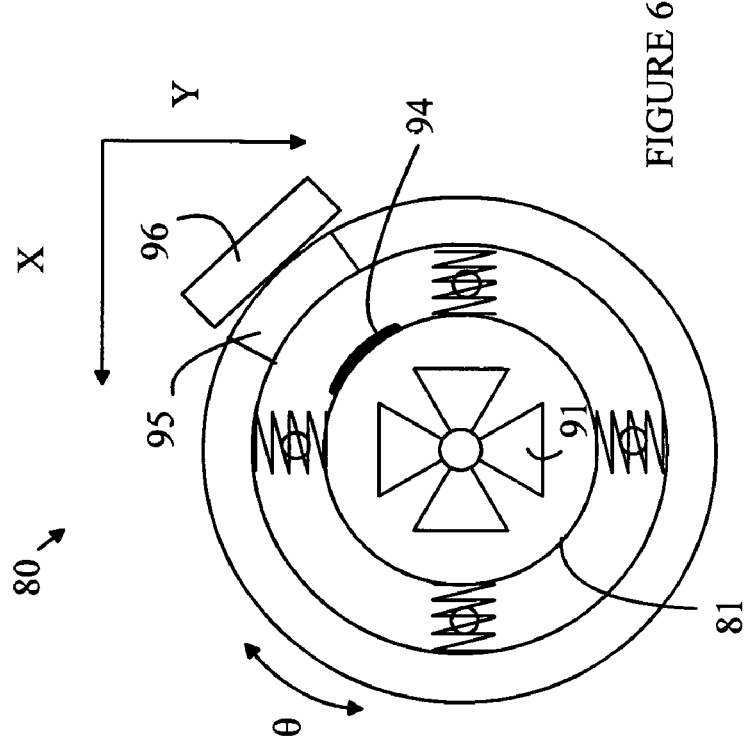
FIG. 6 is a top view of sensor 80 through line 6-6 shown in FIG. 5.
Figure 5:
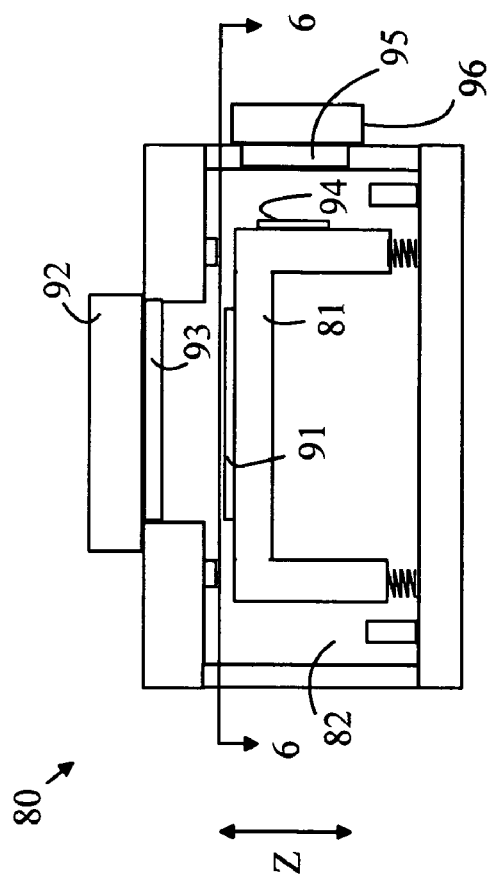
FIG. 5 is a cross-sectional view of another embodiment of a sensor according to the present invention.

To provide improved displacement measurements in the Z-direction, either a second scale must be introduced or scale 71 must be three-dimensional. Refer now to FIGS. 5 and 6, which illustrate another embodiment of a sensor according to the present invention. FIG. 5 is a cross-sectional view of sensor 80, and FIG. 6 is a top view of sensor 80 through line 6-6 shown in FIG. 5. Sensor 80 includes a cylindrical mass 81 that is suspended in a chamber 82 by a plurality of springs that return mass 81 to a resting position when no force is applied to mass 81. Mass 81 has a first scale 91 that is viewed by camera system 92 through window 93 and a second scale 94 that is viewed through a second window 95 by camera system 96. Camera system 92 determines the position and velocity components of mass 81 in the X and Y-directions, and camera system 96 determines the position and velocity components in the Z-direction. Both cameras can be used to measure the rotational position and angular velocity of mass 81 about an axis parallel to the Z-direction.

As noted above, chamber 82 can be filled with a transparent liquid to dampen the motion of mass 81. This feature is, however, optional. In embodiments in which chamber 82 is empty, cameras 92 and 96 can be located within the chambers, and hence, windows 93 and 95 would not be needed.

Figure 7:
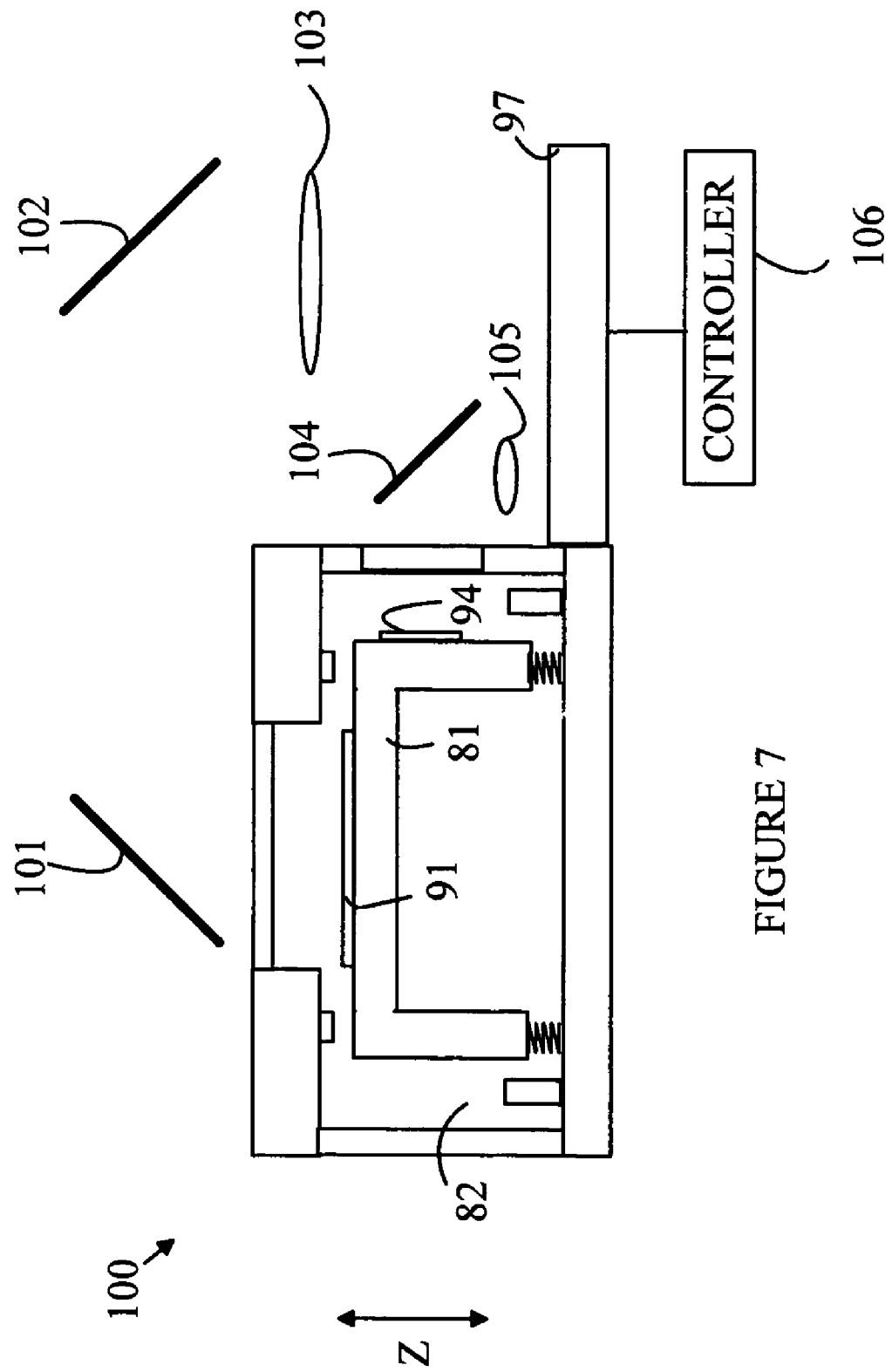
FIG. 7 is a cross-sectional view of another embodiment of a sensor according to the present invention.

While sensor 80 requires two camera systems, it should be noted that a sensor in which the second camera function is implemented by sharing the first camera's sensing array could also be implemented to measure motion in the other directions. Refer now to FIG. 7, which is a cross-sectional view of another embodiment of a sensor according to the present invention. Sensor 100 is similar to sensor 80 discussed above in that sensor 100 has a mass 81 suspended in chamber 82. Mass 81 has two scales attached thereto. Scale 91 provides images used to measure the movement of mass 81 relative to chamber 82 in the X and Y-directions shown in FIG. 4, and scale 94 is used to generate images that are used to measure the position of mass 81 relative to chamber 82 in the Z-direction. The images generated by these scales are formed on a photo-detector array 97 that has sufficient area to accommodate both sets of images. The images from scale 91 are directed to photo-detector 97 by mirrors 101 and 102. A lens 103 images scale 91 onto photo-detector array 97. The images from scale 94 are directed to photo-detector array 97 by mirror 104. Lens 105 images scale 94 onto a second area of photo-detector array 97. Controller 106 processes the two sets of images to generate data on the position of mass 81.

In the above-described embodiments, the camera systems utilized optics with a relatively large depth of field so that the images of the position scales would be in focus over the expected range of positions of the mass in the chamber. In these cases, the scales have a planar geometry. As a result, two scales were needed to provide position measurements that provide position data in all three orthogonal directions, X, Y, and Z. However, if a three-dimensional scale is utilized with a camera having a very small depth of field, then a single scale can provide position data in all three directions.

Refer now to FIGS. 8A-8C, which illustrate another embodiment of a sensor according to the present invention. FIG. 8A is a cross-sectional view of sensor 120. FIG. 8B is an exemplary image formed by photodiode array 123 with one particular example of a position scale. FIG. 8C is another embodiment of a position scale and an image formed by photodiode array 123 with that position scale. Referring to FIG. 8A, sensor 120 utilizes a mass 81 with a code scale 122 that is imaged by a camera system that includes a photodiode array 123 and an optical system 124 having a very narrow depth of focus about a focal plane. For the purposes of this discussion, the depth of focus defines a focal volume bounded by planes that are above and below the focal plane by a distance equal to the depth of focus. Objects in this volume are in focus in the images taken by the camera system, while the images of objects outside this volume are blurred such that the fine details of the objects cannot be seen in the images.

The photodiode array and optical system are fixed relative to housing 130. To simplify the drawing, the structure used to attach photodiode array and optical system 124 to housing 130 has been omitted. In addition, the optical system is represented as a single lens; however, it will be appreciated by those skilled in the art that the optical system may include a number of lens and apertures.

The focal plane of optical system 124 is at the location shown at 125. Position scale 122 has a three-dimensional structure chosen such that the image formed by optical system 124 has a shape that allows the associated controller to determine the position of mass 81 in the X, Y, and Z-directions. In one embodiment, scale 122 is dish-shaped with a circular cross-section. The surface can include a fine-grained pattern. Refer now to FIG. 8B, which illustrates the image on the surface of photodiode array 123. The portion of the fine-grained pattern that is in focus will appear as a ring of diameter D as shown 131. The portion of the image resulting from parts of the position scale that are outside the focal volume will be blurred, and hence, of a more or less uniform intensity. By determining the value of D from the image, the relative position of the mass in the Z-direction can be determined. The position of the ring with respect to the edges of photodiode array 123 can be utilized to provide the X and Y-positions of mass 81 relative to the sides of chamber 130.

If the pattern on the position scale is not rotationally symmetric, the pattern can be compared to the pattern in the previous image by computing the correlation between the two images as a function of a rotation applied to one image. In this case, the rotation of the mass can be deduced as well as its position in X, Y, and Z. To improve the accuracy of such determinations, a specific pattern can be utilized for the position scale. Refer now to FIG. 8C, which illustrates a position scale pattern that could be utilized to enhance the position determinations and the image formed by that pattern in photodiode array 123. Position scale 140 includes a plurality of radially emanating sectors 141 having widths that are a function of the distance from the center of the pattern. The sectors provide a bright pattern compared to background sectors 142. The pattern is attached to the dish-shaped surface discussed above.

The pattern creates an image having 4 bright sectors such as sector 143. The width of each sector is determined by the Z-position of mass 81. The image is determined by the intersection of the focal plane of optical system 124 and pattern 140. As mass 81 moves further from photodiode array 143, the focal plane 125 of optical system 124 intersects the pattern at positions in which the sectors formed by the intersection in question are larger, and hence, the length of the sectors can be used to determine the Z-position of the mass. The sectors rotate with the mass, and hence, by measuring the position of the sectors on photodiode array 123 both the displacement in X and Y can be determined as well as the rotation of mass 81.

The embodiments discussed above with reference to FIGS. 8A-8C require the optical system of the camera to have a depth of field that is the same size or smaller than the accuracy with which the Z-position of the mass is to be determined. In general, this will be a small fraction of the thickness of the position scale. In one embodiment of the present invention, the depth of field is set to be less than $\frac{1}{10}^{th}$ of the thickness of the position scale. In addition, the portion of the position scale that is in focus must be distinguishable from the portions of the position scale that are out of focus. For example, a position scale in which the stripes were uniformly white would perform poorly, since the image of the out of focus portion of the scale would not be significantly different from the in focus portion of the scale. As noted above, a position scale having a pattern that includes a fine texture performs adequately. In this case, the controller can distinguish the in focus portions of the image by the presence of high spatial frequencies in that portion of the image. The out of focus portions of the image will lack such spatial frequencies, since the texture pattern will have been blurred by the optical system.

In contrast, the embodiments discussed with reference to FIGS. 5 and 6 require the depth of focus of camera system 92 to be larger than the maximum allowed motion of mass 81 in the Z-direction. Similarly, the depth of focus of camera system 96 must be larger than the maximum allowed motion of mass 81 in a direction perpendicular to the plane of the photodiode array in the camera.

The above-described embodiments of the present invention utilize a controller that operates on the images formed by the various camera systems and provides measurements that can be used to determine the position of the mass relative to the housing of the sensor. With appropriate calibration data, these measurements provide information on the inertial force to which the mass has been subjected. Hence, a sensor according to the present invention can be used as an accelerometer as well as a vibration detector.

The controller can be constructed from a custom data processing system or computational image similar to that used with optical mice and similar pointing devices. Alternatively, the controller can be a simple interface circuit for coupling the camera system to a second device that performs the appropriate data analysis.

The above-described embodiments utilize a light source such as an LED to illuminate the position scales. However, other light sources can be utilized. In particular, a VCSEL could be utilized in place of the LED to provide a coherent light source. Position measurement schemes based on coherent light sources are known in the art of optical mice and similar pointing devices. For the purposes of the present discussion, it is sufficient to note that the interference patterns generated by the coherent light source can provide enhanced images, which, in turn, provide improved position measurements.

It should be noted that the present invention can also be used as a tilt sensor. If the structure is rotated relative to the earth, the change in direction of the gravitational forces that act on the mass will cause the mass to move from its equilibrium position. The new position can be used to compute the tilt of the structure.

Various modifications to the present invention will become apparent to those skilled in the art from the foregoing description and accompanying drawings. Accordingly, the present invention is to be limited solely by the scope of the following claims.

What is claimed is:

1. A sensor comprising:
    a structure;
    a mass that moves relative to said structure;
    a spring mechanism that applies a restoring force to said mass when said mass moves from an equilibrium position with respect to said structure;
    a first code scale attached to said mass;
    a first imaging system for forming an image of said first code scale, said first imaging system being fixed with respect to said structure; and
    a controller that provides an indication of a position of said mass relative to said structure from said image,
    wherein said mass is located in a chamber in said structure, said chamber comprising a liquid through which said mass moves and
    wherein said first code scale comprises a three-dimensional structure having a pattern thereon, and wherein said three-dimensional structure of said first code scale has a dish-shaped surface that faces said first imaging system.

2. The sensor of claim 1 wherein said restoring force is a monotonic function of a distance between said mass and said equilibrium position.

3. The sensor of claim 1 wherein said first imaging system comprises a light source for illuminating said first code scale and an imaging array.

4. The sensor of claim 1 wherein said chamber comprises a planar surface and said mass moves on said surface.

5. The sensor of claim 1 wherein said liquid is transparent to light.

6. The sensor of claim 1 wherein said indication of said position comprises a measurement of a rotation angle of said mass about a predetermined axis perpendicular to said surface.

7. The sensor of claim 1 wherein said first imaging system is characterized by a focal plane and a depth of focus, said three-dimensional structure having a thickness that is at least 10 times said depth of focus.

8. The sensor of claim 7 wherein said controller determines the portion of said image formed by said first imaging system that is in focus to provide said indication of said position.

9. A sensor comprising:
    a structure;
    a mass that moves relative to said structure, said mass being located a chamber in said structure, said chamber comprising a liquid through which said mass moves;
    a spring mechanism that applies a restoring force to said mass when said mass moves from an equilibrium position with respect to said structure;
    a first code scale attached to said mass;
    a first imaging system for forming an image of said first code scale, said first imaging system being fixed with respect to said structure;
    a controller that provides an indication of a position of said mass relative to said structure from said image, and
    a second imaging system and a second code scale that is attached to said mass, said second imaging system being fixed with respect to said structure and forming an image of said second code scale, wherein said mass moves in three-dimensions and wherein said position indication provides a location for said mass relative to first, second, and third coordinates, said position of said mass relative to a first one of said coordinates being determined from said image formed by said first imaging system and said position of said mass relative to a second one of said coordinates being determined from said image formed by said second imaging system.

10. A sensor comprising:
    a structure;
    a mass that moves relative to said structure;
    spring mechanism that applies a restoring force to said mass when said mass moves from an equilibrium position with respect to said structure;
    a first code scale attached to said mass;
    a first imaging system for forming an image of said first code scale, said first imaging system being fixed with respect to said structure; and
    controller that provides an indication of a position of said mass relative to said structure from said image,
    wherein said mass is located in a chamber in said structure, said chamber comprising a liquid through which said mass moves, and wherein said mass includes first and second surfaces that are orthogonal to each other, said first code scale being attached to said first surface, a second code scale being attached to said second surface, said first and second code scales being used to determine a location for said mass relative to first, second, and third coordinates.

* * * * *

UNITED STATES PATENT AND TRADEMARK OFFICE
CERTIFICATE OF CORRECTION

| | | |
|---|---|---|
| PATENT NO. | : 7,516,659 B2 | Page 1 of 1 |
| APPLICATION NO. | : 11/433022 | |
| DATED | : April 14, 2009 | |
| INVENTOR(S) | : Muniandy Murelitharan | |

It is certified that error appears in the above-identified patent and that said Letters Patent is hereby corrected as shown below:

Column 8, Line 20, Claim 9, delete "located a" and insert --located in a--.

Column 8, Line 47, Claim 10, before "spring" insert --a--.

Column 8, Line 55, Claim 10, before "controller" insert --a--.

Signed and Sealed this

Fourth Day of January, 2011

David J. Kappos
*Director of the United States Patent and Trademark Office*